(No Model.) 2 Sheets—Sheet 1.
A. E. HARRELL.
HAND MOTOR FOR VEHICLES.
No. 409,581. Patented Aug. 20, 1889.
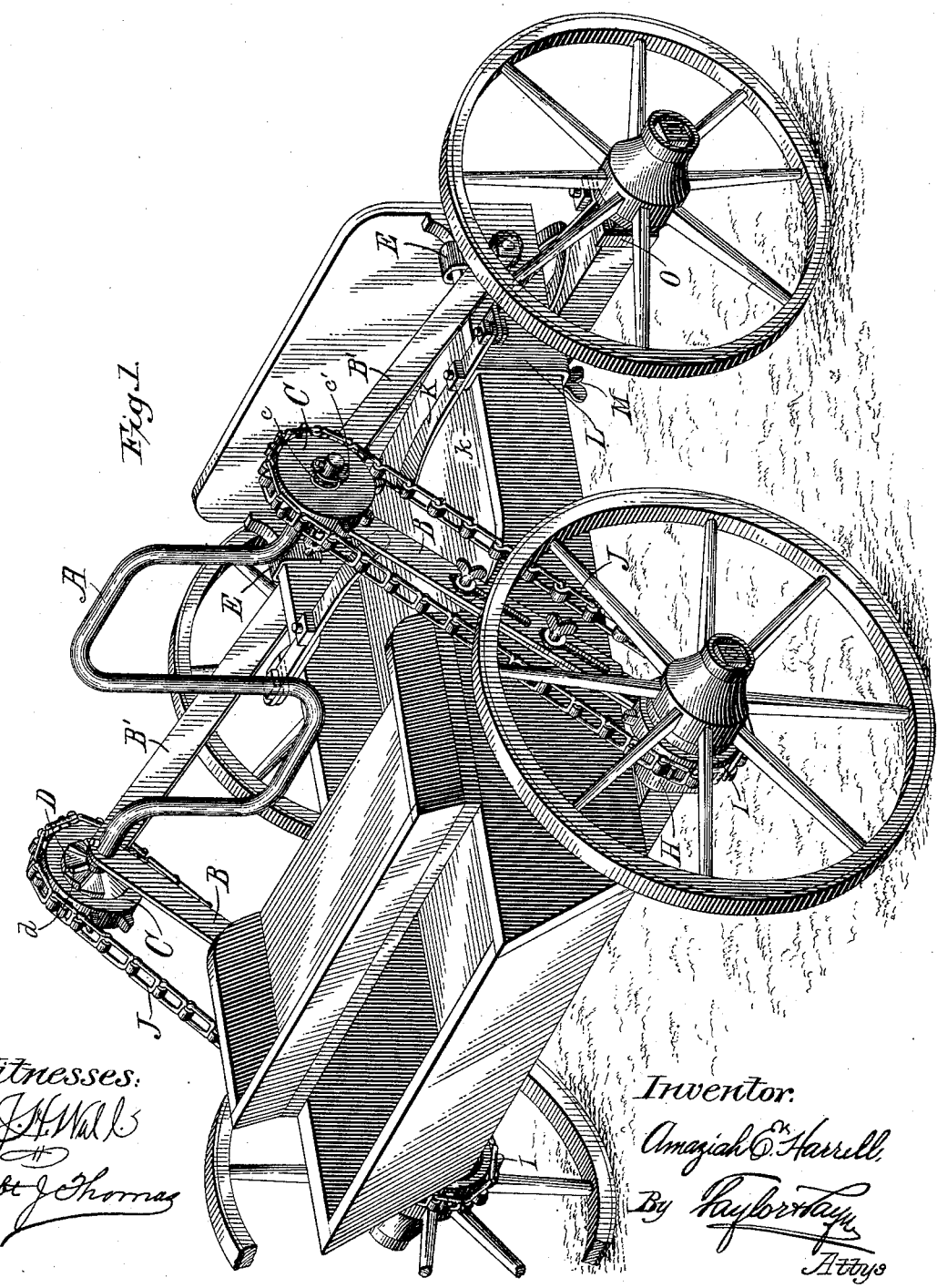

(No Model.) 2 Sheets—Sheet 2.
A. E. HARRELL.
HAND MOTOR FOR VEHICLES.
No. 409,581. Patented Aug. 20, 1889.
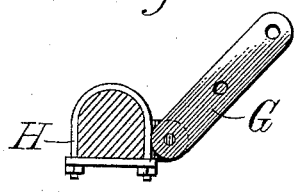
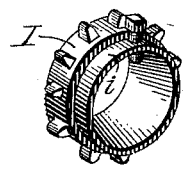
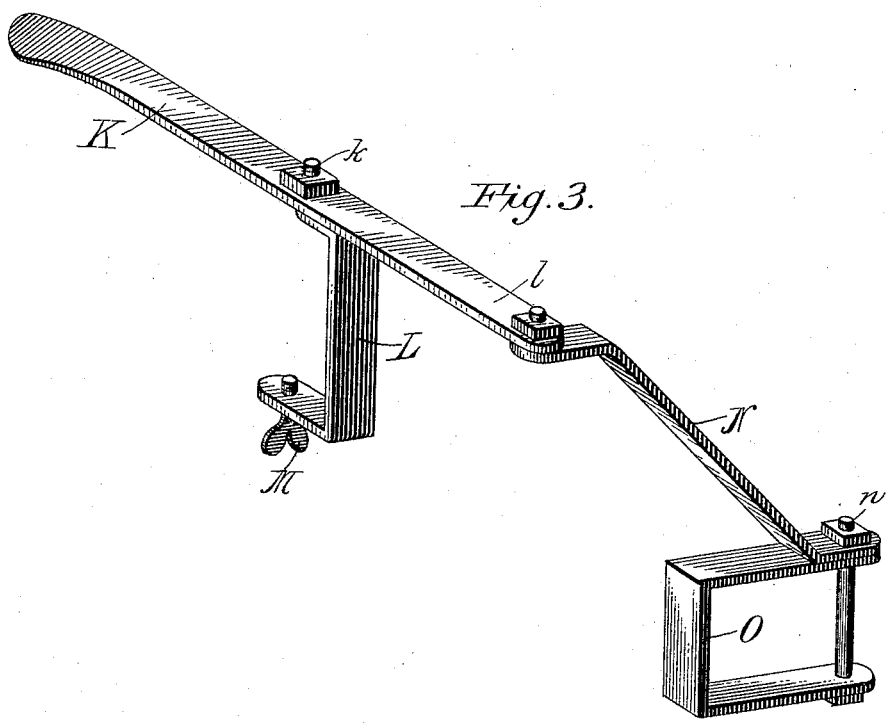

UNITED STATES PATENT OFFICE.

AMAZIAH E. HARRELL, OF WABASH, INDIANA.

HAND-MOTOR FOR VEHICLES.

SPECIFICATION forming part of Letters Patent No. 409,581, dated August 20, 1889.

Application filed May 27, 1889. Serial No. 312,296. (No model.)

*To all whom it may concern:*

Be it known that I, AMAZIAH E. HARRELL, a citizen of the United States of America, residing at Wabash, in the county of Wabash and State of Indiana, have invented certain new and useful Improvements in Manual Motors to be Attached to Four-Wheeled Vehicles, of which the following is a specification, reference being had therein to the accompanying drawings, in which—

Figure 1 is a perspective view showing the motor attached to a vehicle; Fig. 2, a detail view of brace G and clip H; Fig. 3, a detail view of connecting-rod N and clamp O; Fig. 4, a detail view of sprocket-wheel I.

Similar letters refer to similar parts throughout the several views.

My invention relates to manual motors or vehicles propelled by manual power; and the object of my invention is a motor which can be attached to any light four-wheeled vehicle—such as a buggy or road-wagon—without altering the construction of such vehicle, said motor being so constructed as to be easily attached to or removed from the vehicle in a few moments; and my invention consists in the improved construction and combination of parts, as hereinafter fully described and claimed.

The crank-handle A revolves in bearings in the braces B B', and on its ends outside of the braces are loosely set the sprocket-wheels C C, each of which has upon its inner face a crown-ratchet D. Into the crank-shaft are set pawls $d\,d$, which engage with the ratchets D D and communicate motion to the sprocket-wheels, the latter being forced against the pawls by spiral springs $c\,c$, which are held in place on the shaft by collars or butting-rings C' C'. Each of the front braces B' B' has at its upper end a bearing for the crank-shaft, and its lower end is pivoted to a screw-clamp E, designed to inclose the upper edge of the side of the vehicle, the thumb-screw $e$ securing it in position, as shown in Fig. 1. Each of the rear braces B B has at its upper end a bearing for the crank-shaft and in its lower end slots $f\,f$, through which pass the adjusting-screws F F, engaging in the bar or brace G, which is pivoted upon a clip H, as shown in Fig. 2, adapted to be attached to the rear axle of the vehicle. By means of the adjusting-screws and slots the braces may be adjusted so as to loosen or tighten the sprocket-chain. The main sprocket-wheels I I, which are of the shape shown in Fig. 4, are mounted upon the inner ends of the hubs of the driving-wheels of the vehicle, and secured in place by bolts passing through the collars $i\,i$ into the hubs. Sprocket-chains J J connect the sprocket-wheels C C with the wheels I I.

The guiding rods or levers K K are pivoted at their fulcrums $k\,k$ to screw-clamps L L, adapted to be attached to the sides of the vehicle and held in place by thumb-screws M M, as shown in Fig. 1. The outer ends of the guiding-levers K K are pivoted to the connecting-rods N N, which are bent down toward the front axle and pivoted at their ends $n\,n$ to slips or screw-clamps O O, as shown in Fig. 3, to be attached to the front axle of the vehicle.

What I claim, and desire to secure by Letters Patent, is—

1. The combination of crank-handle A, crown-ratcheted sprocket-wheels C, pawls $d$, spiral springs $c$, braces B' B G, adjusting-screws F, screw-clamps E, clips H, sprocket-wheels I, sprocket-chains J, steering-levers K, screw-clamps L, connecting-rods N, and screw-clamps O, substantially as and for the purposes specified.

2. The combination, with the crank-handle A, pawls $d$, crown-ratcheted sprocket-wheels C, sprocket-chains J, and sprocket-wheels I, of the braces B', pivoted to screw-clamps E, braces B, and braces G, pivoted to clips H, as and for the purposes specified.

3. The combination of steering-levers K, screw-clamps L, connecting-rods N, and screw-clamps O, as and for the purposes specified.

4. The combination of crank-handle A, pawls $d$, crown-ratcheted sprocket-wheels C, spiral springs $c$, sprocket-wheels I, and sprocket-chains J, as and for the purposes specified.

In testimony whereof I affix my signature in presence of two witnesses.

AMAZIAH E. HARRELL.

Witnesses:
 BENJAMIN F. WILLIAMS,
 JOHN HARRELL.